(12) United States Patent
Schumacher et al.

(10) Patent No.: US 7,104,882 B2
(45) Date of Patent: Sep. 12, 2006

(54) SIEVE

(75) Inventors: Gustav Schumacher, Gartenstrasse 8, Eichelhardt (DE) 57612; Friedrich-Wilhelm Schumacher, Eichelhardt (DE)

(73) Assignee: Gustav Schumacher, (DE)

( * ) Notice: Subject to any disclaimer, the term of this patent is extended or adjusted under 35 U.S.C. 154(b) by 6 days.

(21) Appl. No.: 10/981,974

(22) Filed: Nov. 5, 2004

(65) Prior Publication Data

US 2005/0101362 A1    May 12, 2005

(30) Foreign Application Priority Data

Nov. 6, 2003   (DE) ................. 103 52 321

(51) Int. Cl.
A01F 12/32   (2006.01)
B07B 1/00   (2006.01)

(52) U.S. Cl. ................ 460/101; 209/394; 209/26

(58) Field of Classification Search ............ 460/85, 460/120, 101, 102, 10; 209/394, 26, 254
See application file for complete search history.

(56) References Cited

U.S. PATENT DOCUMENTS

| | | | | |
|---|---|---|---|---|
| 40,242 A | * | 10/1863 | Capel | 209/397 |
| 434,247 A | * | 8/1890 | Closz | 209/397 |
| 1,200,002 A | * | 10/1916 | McGraw | 460/9 |
| 1,561,632 A | * | 11/1925 | Woodward | 209/397 |
| 2,011,365 A | * | 8/1935 | Kuballe | 209/394 |
| 2,058,381 A | * | 10/1936 | Lindgren | 209/394 |
| 2,827,169 A | * | 3/1958 | Cusi | 209/397 |
| 3,374,886 A | * | 3/1968 | Lightsey | 209/28 |
| 4,008,722 A | * | 2/1977 | Jakobi | 460/8 |
| 4,480,643 A | * | 11/1984 | Alm | 460/120 |
| 5,085,616 A | * | 2/1992 | Matousek et al. | 460/10 |
| 5,588,912 A | | 12/1996 | Schumacher, II et al. | |
| 5,944,993 A | * | 8/1999 | Derrick et al. | 210/388 |
| 6,379,243 B1 | * | 4/2002 | Schumacher et al. | 460/101 |

FOREIGN PATENT DOCUMENTS

DE   71 44 686    6/1973
DE   44 24 383 C2    5/2003

* cited by examiner

Primary Examiner—Árpád Fábián Kovács
(74) Attorney, Agent, or Firm—Harness, Dickey & Pierce, P.L.C.

(57) ABSTRACT

A sieve for a thresher, especially a combine-harvester, for the separation of grain-like field fruits from stalk-like and chaff-like components has channels (2, 2a, 2b) extending parallel to a longitudinal axis (1). The channels (2, 2a, 2b) are open to a first side A, from which they are loaded. The channels (2, 2a, 2b) are delimited by a bottom 3 and laterally following flanks (4, 5) which include openings (9). Air guide following channels (10, 11) are open to a second side B, which face away from the first side A. The two air guide channels (10, 11) are arranged in a direction transverse to the longitudinal axis (1) and are separated by a continuous separation wall (13). The separation wall (13) extends between two neighbouring channels (2, 2a) which extend parallel to the longitudinal axis (1). In these separated air guide channels (10, 11), respectively, the openings (9) of only one of the two channels (2, 2a) separated by the air guide channels (10, 11) are open.

12 Claims, 3 Drawing Sheets

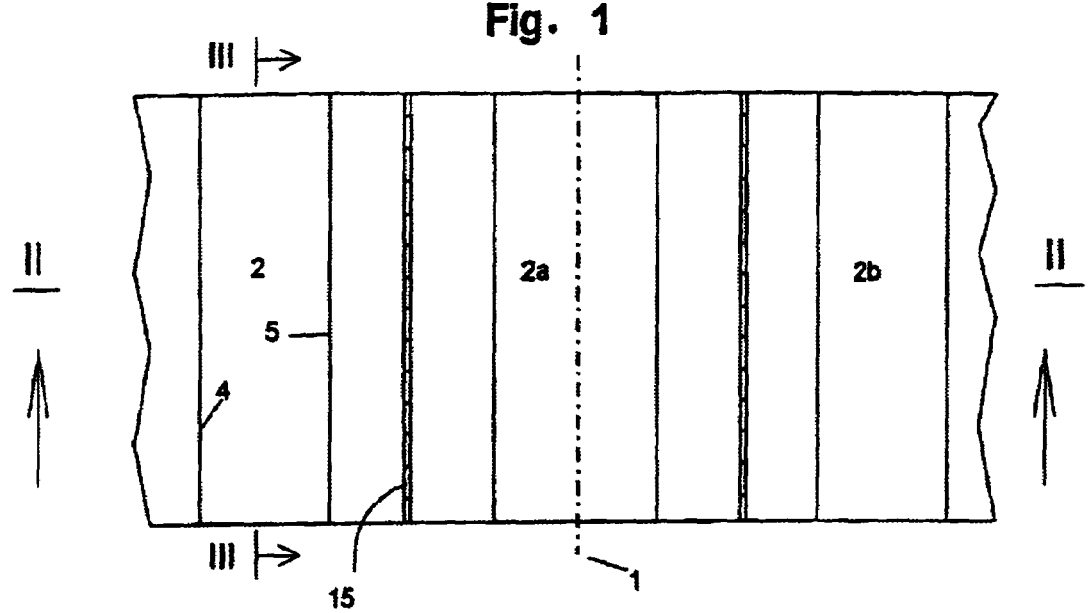
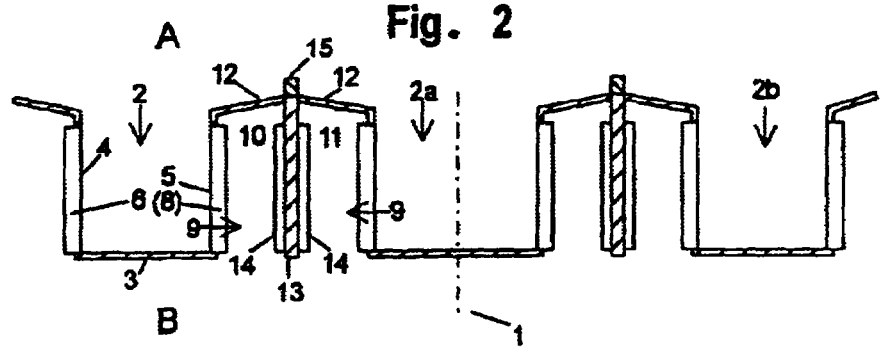

SIEVE

CROSS-REFERENCE TO RELATED APPLICATIONS

This application claims priority to German Patent Application No. 10352321.9 filed Nov. 6, 2003, which application is herein expressly incorporated by reference.

FIELD OF THE INVENTION

The invention relates to a sieve for a thresher, especially a combine-harvester, to separate grain-like field fruits from stalk-like or chaff-like constituents.

BACKGROUND OF THE INVENTION

Modern threshers, especially large combine-harvesters, have very aggressive threshing equipment, which not only disengage the grains from the stalks but also very heavily comminute the stalks. Thus, a large number of short stalk portions or chaff-like constituents are produced, which heavily load the sieve. This has the disadvantage, that the short stalks can align in the conveying direction and provide no sufficient resistance for the air blower to transport them away.

DE 44 24 383 C2 (=U.S. Pat. No. 5,588,912) describes a cleaning sieve having parallel to the longitudinal axis, channels and air guide channels. The channels and air guide channels alternate. The channels are open on a first side from which they are loaded. An air channel is arranged between the respective two channels, following each other in the transversal direction to the longitudinal axis. The air channel is open to a second side, which faces away from the first side. The channels are delimited by a bottom and laterally following flanks. Openings are provided in the flanks, which are open to the corresponding air guide channel, through which the grains can be transported out.

In this embodiment, each air channel provided between two subsequent channels is connected with two laterally following channels, via openings in the flanks. The cleaning air arriving from the second side is guided through the air guide channels. The cleaning air is also guided through the openings in the flanks to the channels and transports the lighter chaff or stalk constituents out through the channels. Such sieves have a very good cleaning effect. Accordingly, during a normal operation, no blockage is produced at a high output. However, a disadvantage is that the stalk constituents, which are aligned in the longitudinal direction in the channels, can be caught in the openings provided in the lateral flanks. The stalk constituents can penetrate, in an inclined manner, the mating air channel and can settle in the opening of the channels following in the transverse direction. Thus, the air pushes the stalk constituents against the limitations of the openings, so that they cannot be transported out of the channels.

SUMMARY OF THE INVENTION

It is an object of the invention to design a sieve formed from channels and air guide channels such that a settling of stalk constituents is not produced. Furthermore, guiding of the air in the air guide channels is improved. In turn, the foreign constituents of chaff and stalk constituents is greatly reduced in the sieved harvesting goods.

According to the invention, a sieve is provided for a thresher, especially a combine-harvester, for the separation of grain-like field fruits from stalk-like or chaff-like components defining in the longitudinal direction a longitudinal axis of the sieve. The sieve includes channels, which extend parallel to the longitudinal axis. The channels are open to a first side from which they are loaded, and are delimited by a bottom and laterally following flanks. The flanks include openings. Air guide channels, which are open to a second side, face away from the first side. Two air guide channels, respectively, in a direction transverse to the longitudinal axis, are separated by a continuous separation wall and are arranged between two subsequent channels. The two air guide channels extend parallel to the longitudinal axis. The openings of only one of the two channels, separated by the air guide channels, are open.

Advantageously, the separation wall prevents a stalk portion which penetrates through the openings from reaching the opposed openings. Furthermore, because of the guide possibilities of the blower air, improved by the separation into separated air guide channels, stalk constituents (components) which settle in an opening can be transported away. Therefore, the proportion of foreign constituents is also effectively reduced in the sieved harvested goods.

In an embodiment of the invention, the separation walls have air guide wings at both sides. The air guide wings project into the two air guide channels and approximate the neighbouring flank of the corresponding channel in a conveying direction. The air guide wings create an air flow directed to the neighbouring flank which practically prevents an intrusion of a stalk portion but enables the grains to exit through the openings.

Preferably, the flanks of the channels are represented by intermediate webs, forming between themselves along the longitudinal axis the openings. Thus it is possible to simplify the manufacture of the sieves. Accordingly, depending on the harvesting goods and the harvesting conditions, the intermediate webs can be arranged at a larger or a smaller distance from each other. Thus, finer or coarser sieves can be manufactured from the same components.

In an embodiment, the two air guide channels, separated respectively by a separation wall, are closed towards the first side by at least one roof shaped end plate. Thus, the harvesting goods, loaded from the first side, are guided, via the roof-shape, into the individual channels.

It is advantageous for the intermediate webs to be delimited laterally by guide portions bent in opposite directions in relation to the longitudinal axis. The guide portions extend opposite in an inclined manner in relation to the conveying direction or the longitudinal axis, respectively. Thus, the stalks which are aligned more or less in the longitudinal direction of the channels, supported by the blower air flowing from the neighbouring air guide channel of the channel connected to the openings, are prevented from reaching the openings. These stalk constituents are carried away by the vibrational movement of the sieve out of the channel in the conveying direction.

It is further advantageous for the openings to expand starting from the bottom towards the first side. If, namely, a small amount of harvesting goods or small grain-like harvesting good is in the channel, smaller opening cross-sections are sufficient to achieve a good sieving of foreign constituents from the harvesting goods. However, as soon as more is loaded into the sieve, e.g., the channels are full, which for example is the case with a coarser grain-like harvesting good, the sieving capacity is increased, as the discharge area of the openings is increased.

At least one conveying strip projects over the end plate to the outside of the first side so that larger stalk constituents, which are transported from the first side out of the sieve, do not reach into the channels. The at least one conveying strip is formed with a serration and extends parallel to the longitudinal axis. Due to the conveying strip, the longer stalk parts are transported away, because of the vibration movement of the sieve, without reaching the channel. The conveying strips are suitably formed integrally with the separation walls. Thus, in a sieve combined from the individual components, the conveying strips form practically connection strips which enable other components to be connected to the conveying strips.

In order to use the sieve according to the invention in a universal fashion, for example in the harvesting of small grains such as rape or seeds, a perforated plate is provided. The perforated plate has a multitude of openings and covers the channels. Preferably, each channel is individually provided with a perforated plate. Alternatively, a plate can be provided, which together comprises all of the perforated plates for all individual channels of a sieve. The plate or the perforated plates, respectively are detachably mounted on the sieve. The openings may be adapted in shape and/or size to the goods to be sieved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a top view of a portion of a sieve according to the invention;

FIG. 2 is a sectional view along line II—II of FIG. 1;

DETAILED DESCRIPTION OF THE PREFERRED EMBODIMENTS

Figure 3:
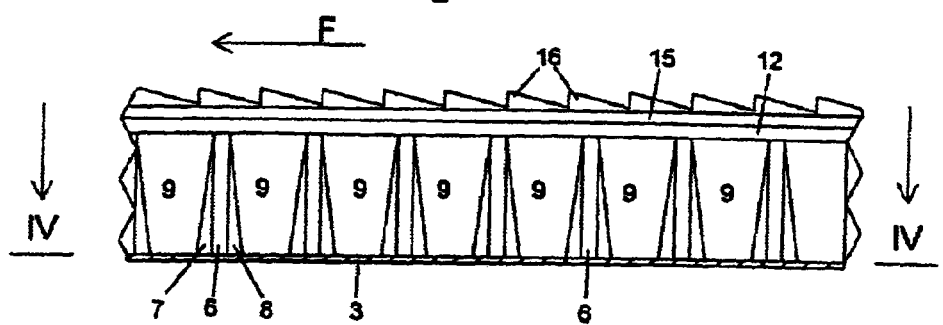
FIG. 3 is a sectional view along line III—III of FIG. 1.

The following description of the preferred embodiment(s) is merely exemplary in nature and is in no way intended to limit the invention, its application, or uses.

FIGS. 1 to 4 show only portions of a sieve according to the invention.

Within a thresher, the sieve according to the invention, formed as a cleaning sieve, represents a sieve. The sieve is loaded by, a not represented, upper sieve or a conveying bottom of an agricultural harvesting machine with a harvesting goods mixture of grains, chaff and small stalk parts.

The sieve includes several channels 2, 2a, 2b extending parallel to each other and to a longitudinal axis 1. Only three channels are represented. As each channel corresponds design-wise essentially to the others, only one channel is described in more detail, namely channel 2 and the connection area towards channel 2a.

The channel 2 has a bottom 3, formed continuously smooth, and two flanks, a first flank 4 and a second flank 5, transversely delimiting the channel. The two flanks 4, 5 are not formed continuously, but are formed by intermediate webs 6. The webs 6 have a base portion and two guide portions 7, 8. The two guide portions 7, 8 are bent in relation to the base portion as seen in FIG. 4, and extend at an angle in relation to the longitudinal axis 1. The first guide portion 7 is, however, bent in an opposite direction to the second guide portion 8 in relation to the longitudinal axis 1. The intermediate webs 6 are arranged along the longitudinal axis 1 and are distanced from each other. Openings 9 are formed between the webs 6 as especially shown in FIG. 3. The openings 9 are formed enlarged away from the bottom 3.

Two air guide channels, a first air guide channel 10 and a second air guide channel 11, extend transversally to the longitudinal axis 1 arranged distanced to each other, between two neighbouring channels 2, 2a or 2a, 2b, respectively. The two air guide channels 10, 11 are distanced with respect to one another. While channels 2, 2a, 2b are open to the first side A, i.e. open upwards, the two air guide channels 10, 11 are open to a second side B, facing away from the first side A, i.e. are open downwards.

The two air guide channels 10, 11 are separated from each other by a separation wall 13. The separation wall 13 is formed continuously closed and extends as do the two air guide channels 10, 11 parallel to the longitudinal axis 1. Thus, this ensures that the channel 2 is only connected, via the openings 9 in the flank 5, to the air guide channel 10. The channel 2a, following transversally to the longitudinal axis 1, is only connected, via the openings 9 between the intermediate webs 6 in the flank 4, to the second air guide channel 11.

The intermediate webs 6, connected to the bottom 3 in the area of the channel 2 and belonging to the flank 5, are connected to two end plates 12. The end plates 12 form a roof shape and are separately connected to the separation wall 13. Also, the end plates can be integrally made from one metal sheet piece. The two channels 2, 2a or 2a and 2b, following subsequently transversally to the longitudinal axis, are connected via the separation wall 13 and the end plates 12. The description in connection with the two channels 2 and 2a is also valid for the following channels 2a and 2b and further channels.

Air guide wings 14 are provided at both sides of the separation wall 13. The air guide wings 14 are positioned along the longitudinal axis 1 in the conveying direction F approximately at the intermediate web 6 of the neighbouring flank 5 or 4, respectively. Thus, the air flowing in is guided in direction to the opposed openings 9. The air guide wings 14 are securely attached to the separation wall 13. When a two part design of the end plate is chosen, a conveying strip 15 extends parallel to the longitudinal axis 1. The conveying strip is provided with serrations 16 distributed along the longitudinal axis 1. The conveying strip is integrally connected to the separation wall 13. The conveying strip serves, due to the movement of the sieve, to convey longer stalks in the conveying direction F.

Figure 4:
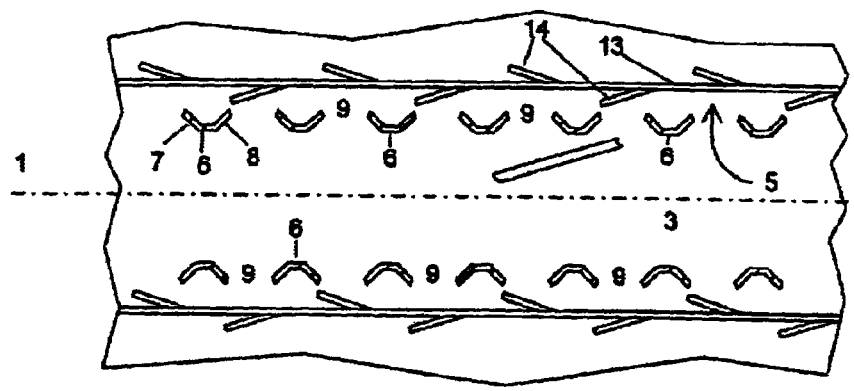
FIG. 4 is a sectional view along line IV—IV of FIG. 3.
Figure 5:
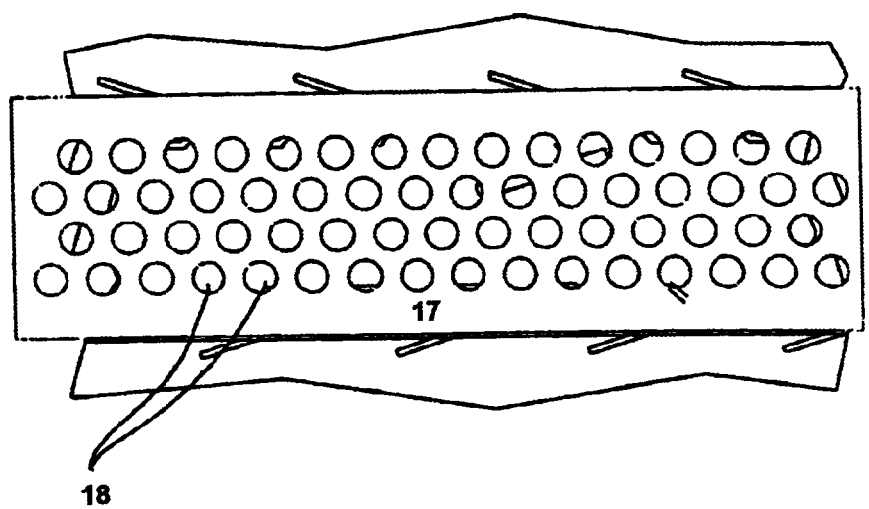
FIG. 5 is a plan view of the embodiment of FIGS. 3 and 4 where the channel is covered by a perforated plate at its upper open portion.

FIG. 5 shows a plan view of the sieve of FIGS. 3 and 4, with the channel shown in FIG. 4, covered at the top by a perforated plate 17. The perforated plate 17 has a multitude of openings 18. This arrangement enables the sieve to be used, practically, as a universal sieve for the harvest of different grain-like fruits. The perforated plate can, for example, be detachably mounted on the sieve when small grains, for example rape or seeds, are to be sieved during harvesting. The openings 18 enable only the grains or seeds, respectively, to pass through it. Thus, the perforated plate 17 enables components which still have not been threshed and still contain grains or seeds, respectively, to reach the channel so that they can be transported away. The losses are reduced, as the components still not completely threshed, are guided back onto the perforated plate 17, when having been threshed again.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sieve for a thresher, especially a combine-harvester, for the separation of grain-like field fruits from stalk-like or chaff-like components, said sieve defining in the longitudinal direction a longitudinal axis, comprising:

channels extending parallel to the longitudinal axis, said channel being open to a first side from which they are loaded; said channels being delimited by a bottom and lateral following flanks, said flanks having openings;

air guide channels being open to a second side facing away from the first side, two air guide channels, when viewed in a direction transverse to the longitudinal axis, being separated by a continuous separation wall and the two air guide channels are arranged between the two subsequent channels, said two air guide channels extending parallel to the longitudinal axis; and each of the two channels separated by the air guide channels are open to air entering through the openings from an adjacent one of said two separated air guide channels.

2. The sieve according to claim 1, further comprising air guide wings at both sides of the separation wall, said air guide wings projecting into the two air guide channels and approximate the neighbouring flank of the corresponding channel in a conveying direction.

3. The sieve according to claim 1, wherein the flanks of the channels are represented by intermediate webs forming between themselves along the longitudinal axis of the openings.

4. The sieve according to claim 1, wherein the two air guide channels, separated respectively by a separation wall, are closed towards the first side by at least one end plate forming a roof shape.

5. The sieve according to claim 3, wherein the intermediate webs are delimited laterally by guide portions bent in opposite directions in relation to the longitudinal axis.

6. The sieve according to claim 1, wherein the openings expand starting from the bottom towards the first side.

7. The sieve according to claim 4, further comprising at least one conveying strip, formed with a serration and extending parallel to the longitudinal axis, said at least one conveying strip projects beyond the end plate externally towards the first side.

8. The sieve according to claim 7, wherein the conveying strip is formed integrally with the separation wall which is connected to the end plates.

9. The sieve according to claim 1, wherein a perforated plate, having a multitude of openings, covers the channels.

10. The sieve according to claim 1, wherein each channel is provided with a perforated plate.

11. The sieve according to claim 9, wherein the perforated plate is detachably mounted.

12. The sieve according to claim 10, wherein the perforated plate is detachably mounted.

* * * * *